US012656450B2

(12) United States Patent
Bajec Strle et al.

(10) Patent No.: US 12,656,450 B2
(45) Date of Patent: Jun. 16, 2026

(54) RADOME FOR A RADAR DEVICE OF A VEHICLE, RADAR DEVICE COMPRISING SUCH A RADOME, CLADDING COMPONENT AND VEHICLE WITH SUCH A RADAR DEVICE AND/OR SUCH A CLADDING COMPONENT

(71) Applicant: Hella Saturnus Slovenija d.o.o., Ljubljana (SI)

(72) Inventors: Alenka Bajec Strle, Ljubljana (SI); Gasper Ducman, Ljubljana (SI); Janez Kogovsek, Ljubljana (SI); Borut Obrul, Ljubljana (SI); Miha Polajnar, Ljubljana (SI); Jernej Slanovec, Kamnik (SI)

(73) Assignee: Hella Saturnus Slovenija d.o.o., Ljubljana (SI)

( * ) Notice: Subject to any disclaimer, the term of this patent is extended or adjusted under 35 U.S.C. 154(b) by 102 days.

(21) Appl. No.: 18/616,077

(22) Filed: Mar. 25, 2024

(65) Prior Publication Data

US 2024/0329191 A1 Oct. 3, 2024

(30) Foreign Application Priority Data

Mar. 31, 2023 (EP) .................................... 23165979

(51) Int. Cl.
*G01S 7/02* (2006.01)
*H01Q 1/42* (2006.01)

(52) U.S. Cl.
CPC ............. *G01S 7/027* (2021.05); *H01Q 1/422* (2013.01)

(58) Field of Classification Search
CPC .......... G01S 7/027; G01S 13/931; G01S 7/02; G01S 2013/93271; H01Q 1/422; H01Q 1/3233; H01Q 1/42; B60R 11/00
See application file for complete search history.

(56) References Cited

U.S. PATENT DOCUMENTS

| | | | |
|---|---|---|---|
| 6,992,640 B2 * | 1/2006 | Usami ..................... | H01Q 1/422 343/705 |
| 11,108,150 B2 * | 8/2021 | Izquierdo Fernandez ................... | H01Q 5/22 |
| 2017/0222311 A1 * | 8/2017 | Hess ...................... | G01S 13/931 |
| 2018/0131099 A1 * | 5/2018 | Geary ...................... | H01Q 1/42 |

(Continued)

FOREIGN PATENT DOCUMENTS

| | | |
|---|---|---|
| DE | 102018009270 A1 | 5/2020 |
| JP | 2006140956 A | 6/2006 |

(Continued)

*Primary Examiner* — Seung H Lee

(74) *Attorney, Agent, or Firm* — Husch Blackwell LLP

(57) ABSTRACT

A radome for a radar device of a vehicle includes a front member made of a radar-transparent resin having a first homogeneous electromagnetic thickness. A second member is also made of a radar-transparent resin having a second homogeneous electromagnetic thickness. A first gap is positioned between the front member and the second member of a third homogeneous electromagnetic thickness (T3), either filled by a gas or a radar-transparent resin. Either: the front member, the second member and the first gap are each individually optimized for radar performance metrics; or a unit consisting of the front member, the second member and the first gap is optimized for radar performance metrics.

14 Claims, 4 Drawing Sheets

(56)     References Cited

U.S. PATENT DOCUMENTS

| | | |
|---|---|---|
| 2020/0335864 A1 | 10/2020 | Shurish et al. |
| 2021/0210846 A1 | 7/2021 | Sekiguchi |

FOREIGN PATENT DOCUMENTS

| | | |
|---|---|---|
| WO | 2020212943 A1 | 10/2020 |
| WO | 2021249817 A1 | 12/2021 |

* cited by examiner

RADOME FOR A RADAR DEVICE OF A VEHICLE, RADAR DEVICE COMPRISING SUCH A RADOME, CLADDING COMPONENT AND VEHICLE WITH SUCH A RADAR DEVICE AND/OR SUCH A CLADDING COMPONENT

CROSS REFERENCE

This application claims priority to European Application No. EP 23165979.8, filed Mar. 31, 2023, the entirety which is hereby incorporated by reference.

FIELD OF THE INVENTION

The present invention is directed to a radome for a radar device of a vehicle. Further, the invention is directed to a radar device comprising such a radome, a cladding component comprising such a radar device or such a radome, and a vehicle equipped with such a radar device and/or such a cladding component.

BACKGROUND OF THE INVENTION

Radar devices for environmental monitoring are widely used in modern motor vehicles, especially in the course of the advancing capability for (partially) autonomous driving. Long-range radar transceivers are usually operated in the frequency range between 72 GHz and 96 GHz and short-range radar transceivers in the frequency range around 24 GHz. Generally, radar transceivers may also be operated at frequencies above 100 GHz and in particular in a frequency range between 130 GHz and 150 GHz where a better resolution of objects in the surroundings of the vehicle may be obtained compared to the lower frequency range.

Such radar devices usually comprise radar transmitters and receiver elements that are arranged close to each other, often integrated in the same unit. Such a unit may be a radar transceiver in which is able to emit radar waves and to receive the radar waves reflected by objects in the environment of the given vehicle. To protect the radar transceivers from environmental and weather influences, they are covered by suitable radomes, which are designed as lid-shaped or dome-shaped covers. The radomes may be integrated into cladding components of a given vehicle such as into larger panels, like front-of-the-car panels or front shields. In order to avoid an impairment of the radar surveillance, the radomes must be designed in such a way that they have as little detrimental interaction as possible with transmitted radar waves of the aforementioned frequency ranges. The interaction may result of an attenuation of the radiation intensity, which is dependent on the material and wall thickness of the radome and can become significant in particular with metallic coatings, for example decorative elements made of chrome. Furthermore, surfaces and interfaces represent critical interaction areas, which can lead to reflection of radar waves in the direction of propagation or to scattering and diffraction in the transverse direction. The wavelengths of the radar waves from the aforementioned frequency ranges are of the order of a few millimeters, and to minimize reflection losses, the radomes are usually dimensioned so that their wall thickness essentially corresponds to a wavelength of the radar waves.

Radomes typically comprise at least two layers, namely a front member and at least a second member on which the front member is mounted. The front member is exposed to the environment, while the second member is often used for fastening the radome to the respective parts of the vehicle, mostly either to the chassis or to a cladding component, in particular of an external cladding component, of the given vehicle. Radomes can be arranged in almost any areas of the vehicle such as on A-pillars or on the bumpers. However, in almost all cases at least one radome is arranged in the front end of the vehicle and mounted to a grille or a fascia. This radome is often decorated with the brand logo of the respective motor vehicle manufacturer. In sophisticated designs, the radome is backlit in such a way that the brand logo is particularly prominent at night. For example, the brand logo can be formed by translucent areas of the radome or the brand logo stands out as an opaque pattern against an illuminated background. Such radomes are disclosed in DE 10 2018 009 270 A1 A2.

WO 2020/212943 A1 discloses a radome at least comprising two members separated by an air gap. The main difference of the approach disclosed in WO 2020/212943 A1 compared e.g., to the ones described in DE 10 2018 009 270 A1 is that the presence of an air gap is considered in the design of the radome, however, the thickness of the members are optimized for radar performance metrics independent of the size of the air gap. Such radar performance metrics may be attenuation, transmission, reflectance, loss, detection range and detection angle, to name a few.

The influence of the air gap as such is not further assessed in WO 2020/212943 A1. Moreover, the radome disclosed therein does not offer further functions such as illumination.

BRIEF SUMMARY OF THE INVENTION

Although the radar performance metrics of the radome disclosed in WO 2020/212943 A1 is improved compared to other radomes known from the prior art, there is a need to find approaches by which the radar performance metrics of a given radome can be further enhanced. It is therefore one task of one embodiment of the present invention to present a radome having further improved radar performance metrics and at the same time offering further functionalities compared to radomes known from the prior art. Furthermore, an embodiment of the present invention has the object to provide a method for optimizing a radome for radar performance metrics, to provide a radar device comprising such a radome and to provide a cladding component for a vehicle with such a radar device. Beyond that, the present invention has the object to present a vehicle being equipped with such a radar device and/or with such a cladding component.

According to an embodiment the radome for a radar device of a vehicle comprises a front member made of a radar-transparent resin having a first homogeneous electromagnetic thickness, a second member made of a radar-transparent resin having a second homogeneous electromagnetic thickness, and a first gap between the front member and the second member of a third homogeneous electromagnetic thickness, either filled by a gas, or filled by a radar-transparent resin, wherein either the front member, the second member and the first gap are each individually optimized for radar performance metrics or the unit consisting of the front member, the second member and the first gap is optimized for radar performance metrics.

The term "electromagnetic thickness" may be understood such that all the radar waves penetrating the radome have to overcome the same resistance generated by the radome. Although the physical thickness in terms of dimensions exhibits a major influence on the electromagnetic thickness, the physical thickness is not the only factor. Another factor influencing the electromagnetic thickness may be the homogeneity of the resin itself, i.e., in terms of density or the presence of bubbles, sinkholes and sink-marks, to name a few. The material of the resin may also influence the electromagnetic thickness.

In the radome according to the present disclosure, the front member, the second member and the first gap are each individually optimized for radar performance metrics. Alternatively, or in addition, the unit comprising the front member, the second member and the first gap is taken as a coherent unit. The entire unit is thus jointly optimized for radar performance metrics. In this case, influences of the front member, the second member and the first gap among each other on the radar performance metrics can be considered.

Optimized radar performance metrics may be manifested for example in that the attenuation exhibited by the radome on the radar waves is reduced and the capture area of the radar transmitter is more uniform compared to radomes known from the prior art. Another aspect that may also be considered in the optimization is the sensitivity of the radar performance metrics and in particular of the attenuation and the reflectance to deviations in the electromagnetic thickness. As mentioned above, the electromagnetic thickness is mainly influenced by the physical thickness of the front member, the second member and the first gap. The deviation of the physical thickness of the front member and the second member are to a large extend determined by the molding process and can be kept within the wanted range by a respective quality control. In contrast to that, the physical thickness of the first gap is determined by the mounting process of the radome and is typically more difficult to control. The deviations of the physical thickness of the first gap are often bigger than the deviations of the physical thickness of the front member and the second member. Another aspect may be deviations in the installation angle of the front member and the second member relative to each other and/or of the radome relative to the transceiver.

The optimization of the radar performance metrics mainly is usually conducted with the aim to find optimized electromagnetic thicknesses of the front member, the second member and the first gap. Another result may be an optimized shape such as a specific curvature of the radome and in particular of the first member.

The optimization of the radar performance metrics may also be conducted such that deviations in particular of the third electromagnetic thickness of the first gap have a minimal influence on the radar performance metrics. Moreover, the optimization can be done such that the final radome can be used in a broader frequency range and it is less sensitive to changes in the applied frequency of the radar signal. Consequentially, a compensation of the variation in dimensions due to the tolerances of the manufacturing process or deviations in the installation angle within the radome or of the radome relative to radar transceiver may be provided.

Another aspect that may be considered for optimization is when the physical or the electromagnetic thickness of a member, for example of the first member, needs to be fixed to a nonoptimal value due to the functional requirements not related to the radar functionality, and then the second member and the first gap (and any number of additional members and gaps) might be adjusted so that the unity of the first member, second member and the first gap (and any number of additional members and gaps) has the best possible performance for the radar metrics.

In a further embodiment the second member is embodied as a functional member. The functional member has at least one further function next to the fastening of the front member to the vehicle, in particular to its external cladding components and/or to the chassis of the vehicle. For this purpose, the functional member may comprise a functional entity. Such functions can be the illumination or tempering of the front member or movably supporting the same. The illumination of the front member may primarily have design reasons. In particular the brand logo of the vehicle manufacturer may be illuminated. The tempering may be the heating of the front member. The heating of the front member may be beneficial to free the same from snow, ice and the like. However, the front member may also be cooled in case of excessive solar irradiation and subsequent heating of the front member.

A movable support may be desired for absorbing impacts acting on the front member which may be exerted by objects or pedestrians.

In case of illumination, illumination elements such as light guides, projectors and/or diffusors may be arranged in the functional member which may have an influence on the radar waves penetrating the radome. In case of a movable support damping elements such as springs may be arranged in the functional member. When optimizing the entire unit for radar performance metrics, influences of such functional entities may be considered in the optimization process.

In the radome according to the present embodiment, the front member, the functional member and the first gap are each individually optimized for radar performance metrics. Alternatively, the unit comprising the front member, the functional member and the first gap is taken as a coherent unit. The entire unit is optimized for radar performance metrics.

Using the approach to consider these components as a coherent unit, influences of the components of the unit on each other with respect to the radar performance metrics of the entire radome may be considered in the optimization process. As an example, the attenuation of the radar waves penetrating the radome can be reduced, at the same time the radome offers additional functions.

In another embodiment the radome further comprises a housing having a radar penetration section made of a radar-transparent resin, the radar penetration section having a fourth homogeneous electromagnetic thickness, a second gap between the radar penetration section and the second member, either filled by a gas, or filled by a radar-transparent resin, wherein either the radar penetration section is individually optimized for radar performance metrics or the unit consisting of the front member, the second member, the radar penetration section, the first gap and the second gap is optimized for radar performance metrics.

Compared to the first embodiment, the radome of this embodiment comprises a housing to which the front member and the second member are mounted. The housing serves for the protection of the front member and the second member against exterior influences such as environmental and weather influences, however, in the radome according to this embodiment the housing and the second gap are included in the optimization for radar performance metrics next to the first member, the second member and the first gap. In case the radome forms further gaps, they are also considered in the optimization for radar performance metrics.

A further embodiment the functional member comprises one or more illumination elements. Illumination elements could be a light guide, a projector, a diffusor and the like. An indirect or a direct illumination of the front member can be provided, including the generation of a light curtain. In particular in case a projector is used, only a projection surface is located in the area of functional member, while the projector elements, such as lenses and light sources, are arranged at distance from that area, in particular at the back or at the side of the radome and/or the housing.

As mentioned, some radomes are decorated with the brand logo of the respective vehicle manufacturer. This brand logo may be illuminated by the radome according to this embodiment, which adds to the individual exterior vehicle design. To ensure a homogeneous illumination e.g., of the brand logo, the refractive index of the first gap, the second gap and/or the radar-transparent resin is lower than the refractive index of the light guide. This is also true in case the radome forms further gaps.

According to another embodiment the front member has a first surface facing to the exterior and a second surface facing to the second member, wherein at least one further layer is applied to the first surface. The further layer may be embodied as a protective coating which may protect the front member as such against exterior influences such as stone chipping. At the same time the resin of the front member may be protected e.g., against UV-radiation.

In a further embodiment the functional member and/or the front member comprises a plurality of opaque sections. Such opaque sections may be used to illuminate the front member according to a brand logo. The brand logo may be created on the first surface by coloring, metallization, lacquering and the like. To this end, a foil may be applied to the first surface and/or molded into the front member. The brand logo is thereby visible to a person at day light. However, when backlit, light scattering effects may be created such that the contours of the brand logo are not clearly defined. The use of opaque sections in particular inside the front member and the functional member may lead to an improved image sharpness of the brand logo without significantly changing the respective electromagnetic thickness and/or the radar performance metrics.

In another embodiment the functional member comprises one or more light outcoupling units and/or light optimization elements. The light outcoupling units are used to illuminate specific areas of the radome, in particular of the front member. The available light can be conducted to areas where it is needed and can thus efficiently be used. Light optimization elements may provide the desired light distribution in particular on the front member. They may be incorporated into the light outcoupling units which in this case not only serve for introducing the light into the radome but also introduce the light in the desired way. However, the light optimization elements may be separate elements like a section of the radome and/or the light guide being made of a material with a different volumetric scattering. The light optimization elements may be used for certain areas for providing the desired light patterns with the desired brightness distribution. The functional member may also be provided with one or more light incoupling elements for coupling light provided by a light source into the radome.

Another aspect of the invention is directed to a method for optimizing a radome according to one of the embodiments previously presented for radar performance metrics, comprising the following steps: individually optimizing the front member, the second member and the first gap for radar performance metrics, and/or optimizing the unit consisting of the front member, the second member and the first gap for radar performance metrics.

The technical effects and advantages as discussed with regard to the present radome equally apply to the method.

The radar performance metrics may be optimized such that the attenuation exhibited by the radome on the radar waves is reduced and the capture area of the radar transmitter is more uniform compared to radomes known from the prior art. This is in particular true when the unit consisting of the front member, the second member and the first gap is considered as a coherent unit and this unit is optimized for radar performance metrics. When the front member, the second member and the first gap are considered as one unit when optimizing, interactions between these units will be detected and can be considered in the optimization process, leading to improved radar performance metrics. The optimization may be done to find optimized electromagnetic thicknesses, optimized curvatures of the front member and/or optimized radar-transparent resins.

The two approaches can be applied separately or together. When applied together, the front member, the second member and the first gap for radar performance metrics are first individually optimized to get a starting point. After that the entire unit is optimized.

A further embodiment of the method is characterized in that the second member is embodied as a functional member. The attenuation of the radar waves penetrating the radome can be significantly reduced, at the same time the radome offers additional functions. Although the individual optimization of the front member, the functional member and the first gap was found to result in improved radar performance metrics, the approach to consider these components as a coherent unit may even result in better radar performance metrics. As mentioned, in this optimization approach, the interactions between the front member, the functional member and the first gap can be considered which may otherwise remain undetected. In particular the functions the functional member may be provided with, e.g., the emitted light, may have an influence on the radar performance metrics which may not have been expected. Such surprising effects can be considered in the optimization of the radar performance metrics when the front member, the functional member and the first gap are considered as a coherent unit, leading to improved radar performance metrics compared to radomes known from the prior art.

Another aspect of the invention is directed to a radar device, in particular for a vehicle, comprising a radar transceiver for emitting and receiving radar waves, a radome according to one of the preceding embodiments, wherein the radar transceiver is arranged such that the radar waves emitted by the radar transceiver are penetrating the radome.

A further aspect of the present invention relates to a cladding component of or for a vehicle, comprising a radome according to one of the preceding embodiments, and/or a radar device according to the embodiment previously mentioned.

The cladding component may be embodied as an external cladding component such as a bumper, a grille or another panel-like part to which the radome may be fastened or to which it may be integrated.

Yet another aspect of the invention is drawn to a vehicle comprising the radar device or a cladding component according to the preceding embodiments.

The technical effects and advantages as discussed with regard to the present radome equally apply to the radar device, the cladding component and the vehicle. In brief, the optimization of the radar performance metrics may be conducted such that deviations in particular of the third electromagnetic thickness of the first gap mainly caused by manufacturing inaccuracies have a minimal influence on the radar performance metrics. Moreover, the optimization can be done such that the final radome can be used in a broader frequency range and it is less sensitive to changes in the applied frequency of the radar signal.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 shows a first embodiment of a radar device according to the invention.

FIG. 2 shows a second embodiment of a radar device according to the invention.

DETAILED DESCRIPTION OF THE DRAWINGS

Figures 1, 2:
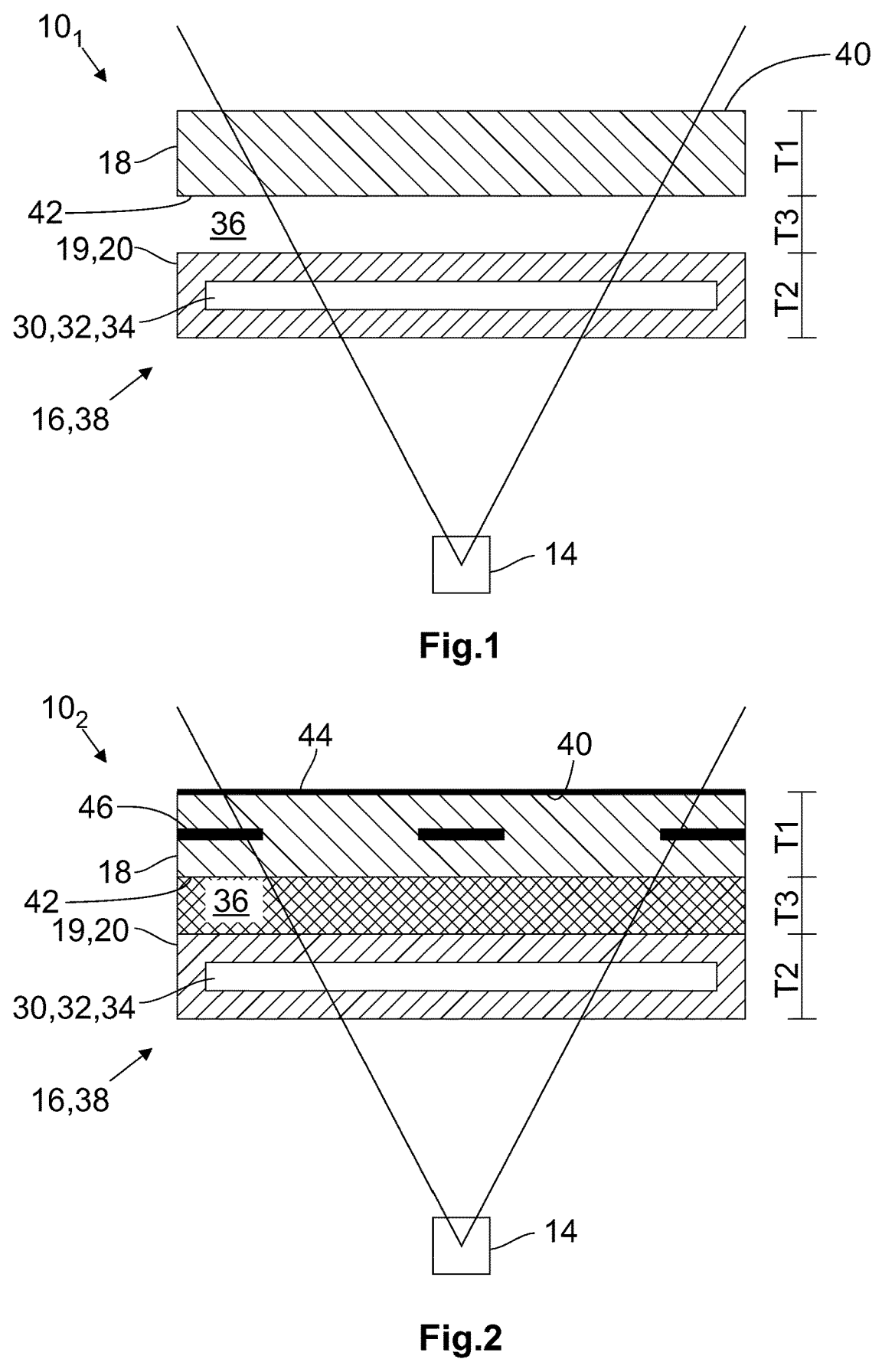
Figure 3:
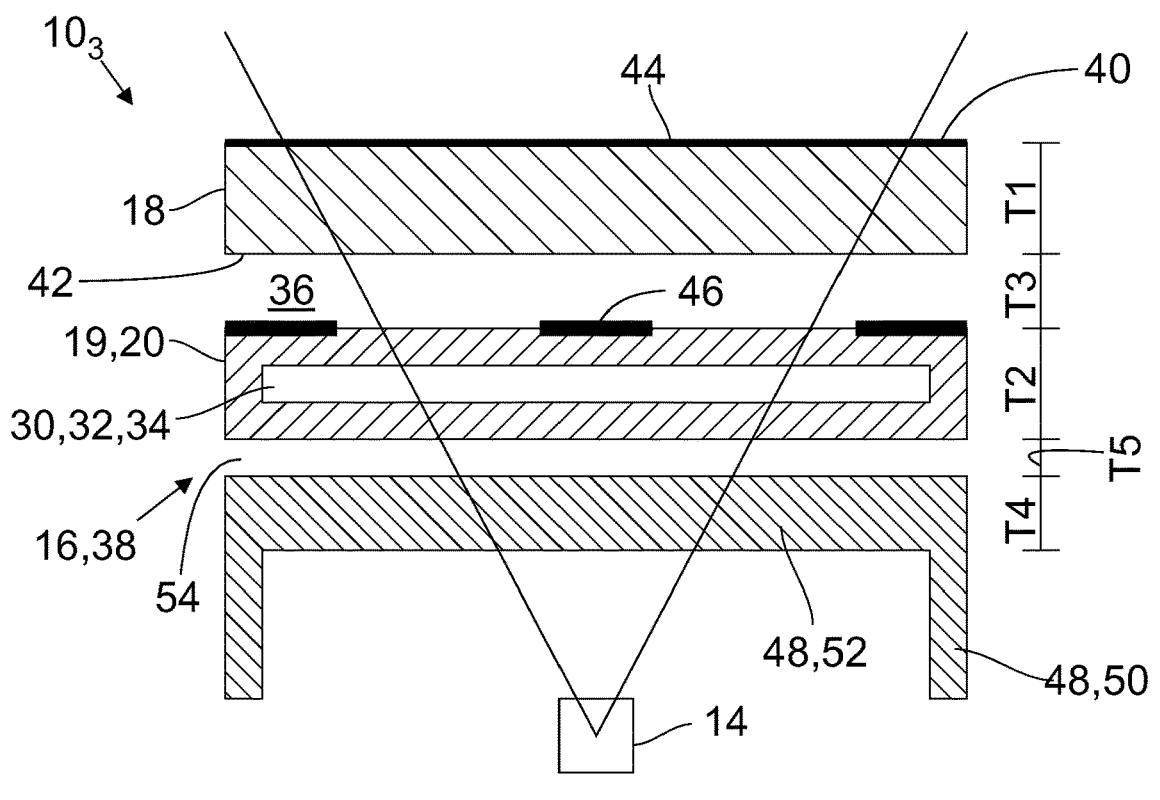
FIG. 3 shows a third embodiment of a radar device according to the invention.

FIG. 1 shows a first embodiment of a radar device 101 of a vehicle 12 (see FIG. 5) according to the present invention. The radar device 101 comprises a radar transceiver 14 for emitting radar waves and for receiving the reflected parts of the emitted radar waves. The radar transceiver 14 combines radar transmitters and radar receivers (not shown), however, it should be noted that these elements may also be embodied as separate units which may also be located at distance from each other. Such embodiments should also be considered as comprised by the term "radar transceiver".

Moreover, the radar device 101 comprises a radome 16 that is located such that at least the majority of radar waves emitted by the radar transceiver 14 are penetrating the radome 16.

In the first embodiment, the radome 16 comprises a front member 18 and a second member 19, both being made of a radar-transparent resin. The front member 18 and the second member 19 may be made of the same or a different radar-transparent resin.

Figure 4:
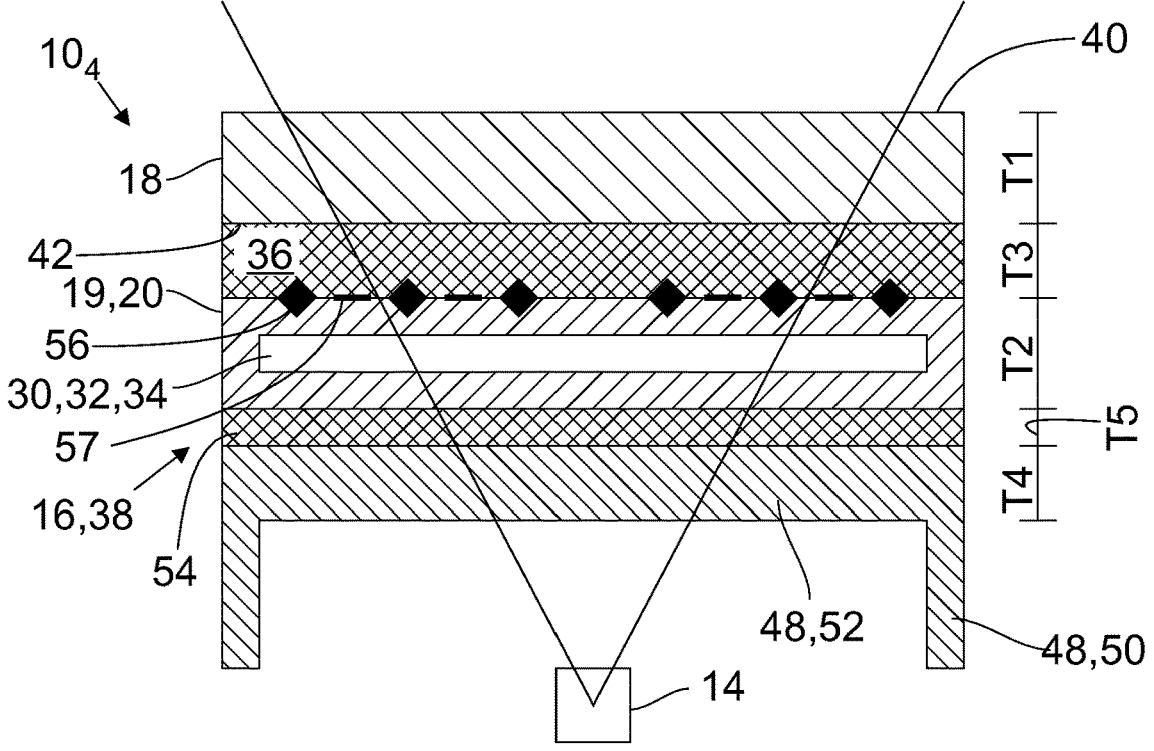
FIG. 4 shows a fourth embodiment of a radar device according to the invention.

The front member 18 is facing to the exterior of the vehicle 12, while the second member 19 is facing to the interior of the vehicle 12 and may be used for fastening the radome 16 to vehicle 12 components, in particular to cladding components 22 such as bumpers 24, fascia, grilles 26 or the like or to side beams 28 of the vehicle 12 (see FIG. 4). The second member 19 is embodied as a functional member 20 which is equipped with a functional entity 30 which may be an illumination element 32 such as a light guide or may provide a light curtain. In both cases the front member 18 can be illuminated. This aspect will be described in greater detail further below.

Alternatively or in addition the functional entity 30 may comprise a temperature control element 34 for controlling the temperature of the front member 18 to avoid extremely high or extremely low temperatures during operation of the radar device 101.

The front member 18 has a first homogeneous electromagnetic thickness T1 and the functional member 20 has a second homogeneous electromagnetic thickness T2. For representation reasons the electromagnetic thicknesses T1 and T2 (and the ones defined and described later) are shown in terms of physical thicknesses of the respective members. However, it is noted that members having an irregular physical thickness may have a homogeneous electromagnetic thickness.

A first gap 36 is formed between the front member 18 and the functional member 20. The first gap 36 has a third homogeneous electromagnetic thickness T3. In this embodiment the first gap 36 is void and only filled by a gas, in particular with air. In the latter case the first gap 36 may also be considered as a first air gap.

In a first approach, the front member 18, the functional member 20 and the first gap 36 are each individually optimized for radar performance metrics. Such radar performance metrics may be attenuation, reflectance, loss, detection ranged and detection angle. Key parameters for optimizing the radar performance metrics are the first homogeneous electromagnetic thickness T1, the second homogeneous electromagnetic thickness T2 and the third homogeneous electromagnetic thickness T3. Other parameters may be choice of the radar-transparent resin. It may be beneficial for the radar performance metrics to use the same radar-transparent resin for the front member 18 and the functional member 20 or to use a particular combination of a first radar-transparent resin for the front member 18 and a second radar-transparent resin for the functional member 20.

As mentioned above, the first gap 36 is typically filled with air. However, the first gap 36 may be hermetically closed and filled with a particular gas which influences the radar performance metrics in the desired way. Not explicitly shown is an embodiment in which the first gap 36 is hermetically closed and evacuated.

In a second approach, the radome 16, in this case the front member 18, the functional member 20 and the first gap 36 are considered as one coherent unit 38. The radar performance metrics of the entire unit 38 are optimized with regard to the radar performance metrics. It is believed that in this approach the influence of the functional member 20 can better be considered compared to the individual optimization. The first approach and the second approach can also be combined in that the first approach is the first step of the optimization followed by the second approach as the second optimization step.

In FIG. 2 a second embodiment of the radar device 102 is shown. The built-up of the embodiment of the radar device 102 of the second embodiment is to a large extend the same as described for the radar device 101 of the first embodiment. Thus, only the key differences are described in the following.

The main difference is that the first gap 36 is filled with a radar-transparent resin. One reason to fill the first gap 36 may be to improve the mechanical properties of the radome 16, e.g., in terms of structural stability. The choice of the radar-transparent resin is conducted in consideration of an optimized radar performance metrics. The radar-transparent resin may be the same as used for the front member 18 or the functional member 20, however, it may also be a different resin.

The front member 18 has a first surface 40 facing the exterior of the vehicle 12 when mounted to the same, and a second surface 42 facing the functional member 20. A further layer is applied on the first surface 40 which may be embodied as a protective coating 44 for protecting the front member 18 from exterior influences such as UV-radiation and stone chipping.

Further, one or more opaque sections 46 are located inside the front member 18. The opaque sections 46 are opaque with respect to light but not to radar waves. The remaining front member 18 may be transparent to light and the functional entity 30 of the functional member 20 comprises an illumination element 32 such as a light guide or the like such that the front member 18 can be illuminated. The opaque sections 46 are arranged such that the light leaving the front member 18 defines a certain pattern, in particular the brand logo of the vehicle 12 manufacturer and/or the type designation.

FIG. 3 shows a third embodiment of the radar device 103 according to the present invention. In this case the first surface 40 is also covered with the further layer 44. However, the first gap 36 is-like in the first embodiment-filled with a gas such as air or evacuated. The opaque sections 46 are in this case arranged on a surface the functional member 20 facing the first gap 36.

Moreover, the radome 16 comprises a housing 48 by which the radome 16 can be fastened to components of the vehicle 12 such as a grille 26, a fascia or a bumper 24. For this purpose the housing 48 comprises fastening sections 50. Moreover, the housing 48 comprises a radar penetration section 52 which may be made of a different material than the fastening sections 50. In any case, the radar penetration section 52 is radar-transparent. A second gap 54 is arranged between the housing 48 and the functional member 20. In this case, the second gap 54 is filled by a gas, in particular by air. The second gap 54 may also be evacuated. The second gap 54 may have a fifth homogeneous electromagnetic thickness T5 which may also be chosen as the third homogeneous electromagnetic thickness T3 of the first gap 36.

In FIG. 4 a fourth embodiment of the radar device 104 is shown which to a large extent has a similar built-up as the third embodiment of the radar device 103. However, the first gap 36 and the second gap 54 are filled by a radar-transparent resin. The refractive index of the radar transparent resin is lower than the refractive index of the illumination element 32. Moreover, a plurality of light outcoupling units 56 is arranged on the functional member 20 which interact with the functional unit 38 in a way that light that is introduced into the functional member 20 or produced in the same is emitted in a specific way. The number of light outcoupling units 56 is freely selectable. The radome 16 may also be provided with a single outcoupling unit 56 only. Beyond that, the radome 16 is equipped with one or more light optimization elements 57. In the fourth embodiment of the radar device 104 the light optimization elements 57 are embodied as painted layers, for example made of white or diffusive or highly reflective paint or surface and may serve for reducing hot spots. For reducing hot spots, not only a high reflectivity is of importance, but also the lack of color shift.

Thereby, a particular light effect or a particular pattern may be produced. The light outcoupling units 56 are radar-transparent and may be embodied such that the surface of the functional member 20 facing the front member 18 in the light outcoupling units 56 are interrupting the internal total reflection, here of the light guide 30. For this purpose, the surface may be pigmented, provided with specific recesses or protrusions (such as grains) and/or micro-optical properties. The pigmentation for light outcoupling may be provided with a foil which may be arranged on the first surface 40 of the front member. The pigmentation can be produced with a pattern or through variation of the layer thickness/density, so that the outcoupled light has a different intensity and/or distribution in different areas. Alternatively, the light outcoupling units 56 may be formed by sections of the radome 16 or the light guide 30 having a material with a different volumetric scattering for providing additional light optimization and for promoting light outcoupling. A two-component molding, sometimes also referred to as 2k-molding, can also be employed for providing the light outcoupling units 56.

In FIG. 4 the light outcoupling units 56 are arranged on the surface of the functional member 20 facing the first gap 36. Alternatively or in addition, the light outcoupling units 56 may also be arranged on the surface facing the second gap 54 and/or integrated into the light guide 30. The amount and the position of the light outcoupling units 56 and/or the light optimization elements 57 is freely selectable.

Figure 5A:
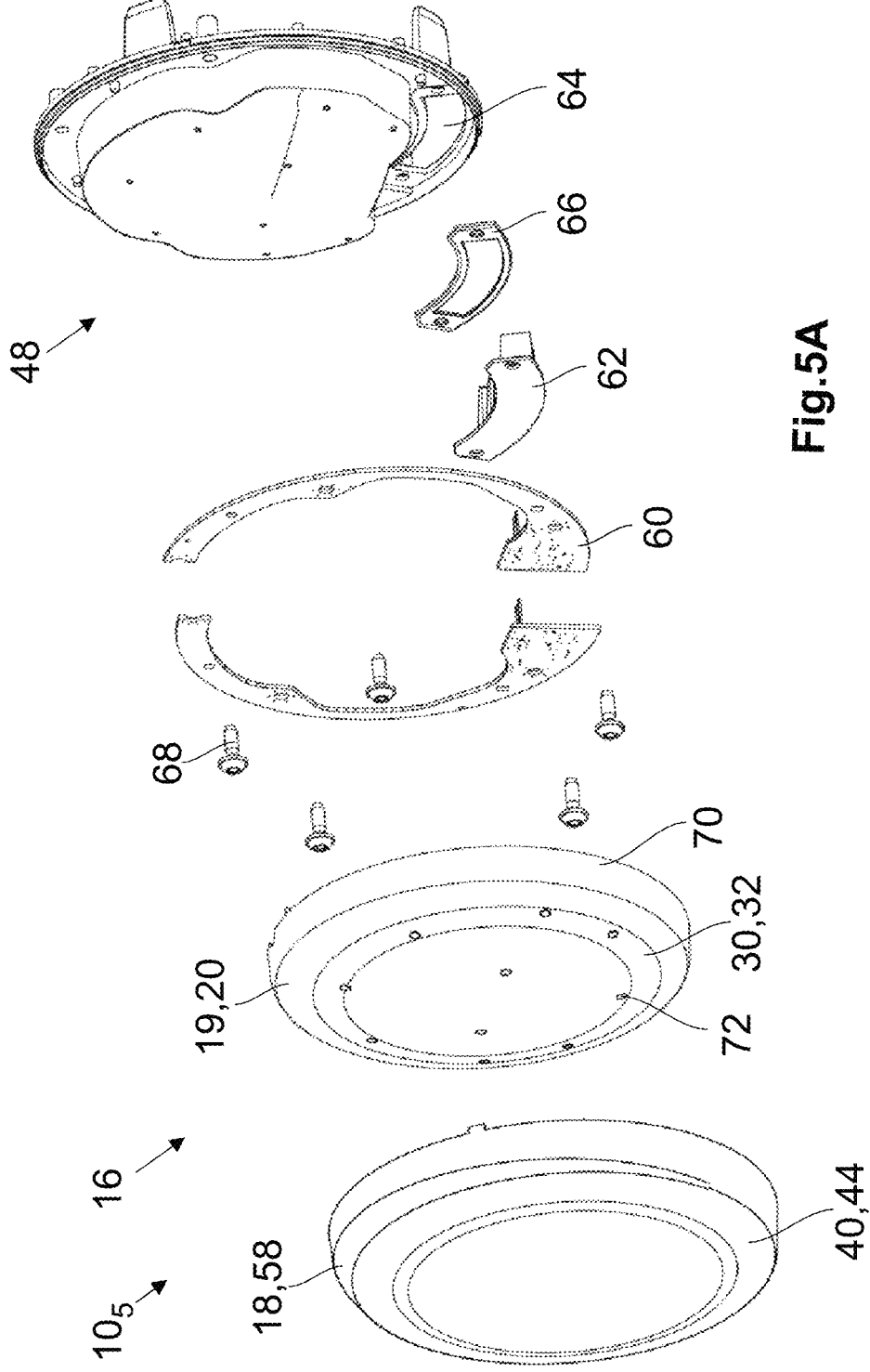
FIG. 5A shows a a radome of a fifth embodiment of a radar device according to the invention by means of an exploded view.
Figure 5B:
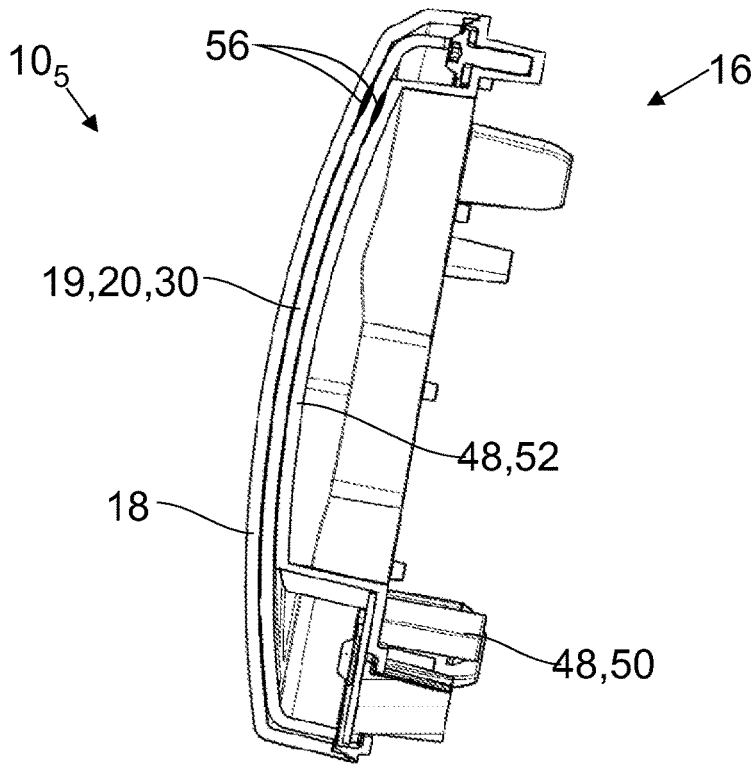
FIG. 5B shows the radome of FIG. 5A in a mounted state.

In FIG. 5A a fifth embodiment of the inventive radar device 105 is shown by means of an exploded view. FIG. 5B shows this radar device 105 in the mounted state. The front member 18, which may also be described as a cover lens 58, may be provided with the already mentioned further layer 44 on the first surface 40 and with a metallization layer on the second surface 42 (not visible in FIG. 5A) which may be colored, preferably in black. The front member 18 may also be formed by a plastic part (one-component molding, two-component molding etc.) with any combination of metallization, color, lacquering and the like, the latter being provided by a foil.

The functional entity 30 of the functional member 20 comprises the illumination element 32 or a light curtain with a light outcoupling unit 56 (see FIG. 5B) which may be printed, on the back side, e.g., by pad-printing. However, light outcoupling can be achieved with different techniques of pigmentation and surface treatments, e.g., with stickers or with small optical prisms in a size range, which is not significantly disturbing the radar waves. The light guide 30 is provided with the light outcoupling units 56 on both surfaces. At least in the section penetrated by the radar waves (not shown), the radome 16 is provided with a curvature. The physical thicknesses of the front member 18, the second member 20 and the radar penetration section 52 may vary within the curvature, to provide a homogeneous electromagnetic thickness. This variation may be larger the smaller the radius of the curvature is. In the embodiment shown in FIGS. 5A and 5B, the front member 18, the second member 20 and the radar penetration section 52 have a constant physical thickness as the radius of the curvature is comparatively large.

Printed circuit boards 60 are provided with LEDs (not explicitly shown) to provide the light for illuminating the front member 18. The number of the printed circuit boards 60 and their position may be adjusted according to the needs of the particular application. The same is true for the power supply for the LEDs (not explicitly shown). The LEDs may be molded into other components and may be replaced by another light source.

The radar device 105 of the fifth embodiment is further equipped with a heat sink 62 to remove heat from the radome 16. Alternatively, the heat may be removed actively (e.g., with a fan) or passively (e.g., with heat conductive housing material). As evident from FIG. 5A, the housing 48 comprises an opening 64 in which the heat sink 62 is located in the mounted state. A gasket 66 is provided to seal this opening 64. In an alternative embodiment which is not shown, the gasket 66 may be omitted, e.g., when the heat sink 62 is molded into the housing 48. The housing 48 may enclose the radar transceiver 14 (not shown in FIGS. 5A and 5B) that may be positioned inside the radome 16.

The functional member 20, the printed circuit board 60, the heat sink 62, the gasket 66 and the housing 48 are fastened to each other by screws 68. The front member 18 is fastened to the housing 48 e.g., by gluing, welding or by means of a latching connection.

The light emitted by the light sources located on the printed circuit boards 60 is introduced into the second member 19 by light incoupling elements 70 which are integrated into the second member 19. The light is then transmitted to the illumination element 32 and outcoupled therefrom by the light outcoupling units 56 which are not explicitly shown in FIGS. 5A and 5B.

A plurality of bumps 72 is arranged on the second member 19. The bumps 72 primarily serve for providing the third homogeneous electromagnetic thickness T3 of the first gap 36 (see FIGS. 1 to 4).

Figure 6:
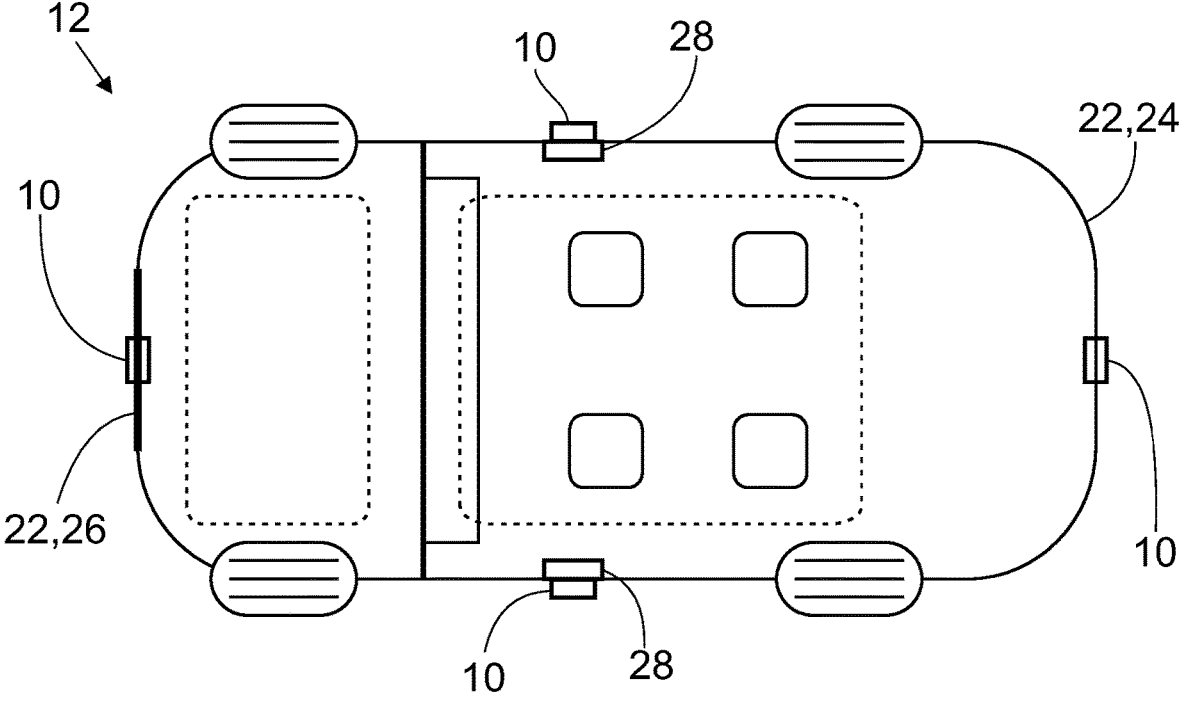
FIG. 6 shows a vehicle equipped with a radar device according to one of the shown embodiments.

FIG. 6 shows a vehicle 12 that is equipped with a plurality of radar devices 10 according to one embodiment of the present invention. The radar devices 10 are located at the side beams 28 of the vehicle 12, in particular on the A-pillar, B-pillar and/or C-pillar. Another radar device 10 is arranged on a rear-bumper 24 of the vehicle 12. A further radar device 10 is fastened to the grille 26 of the vehicle 12.

REFERENCE LIST

10 radar device
101-105 radar device
12 vehicle
14 radar transceiver
16 radome
18 front member
19 second member
20 functional member
22 cladding component
24 bumper
26 grille
28 side beam
30 functional entity
32 illumination element
34 temperature control element
36 first gap
38 unit
40 first surface
42 second surface
44 protective coating
46 opaque section
48 housing
50 fastening section
52 radar penetration section
54 second gap
56 light outcoupling unit
57 light optimization element
58 cover lens
60 printed circuit board
62 heat sink
64 opening
66 gasket
68 screw
70 light incoupling element
72 bump
T1 first homogeneous electromagnetic thickness
T2 second homogeneous electromagnetic thickness
T3 third homogeneous electromagnetic thickness
T4 fourth homogeneous electromagnetic thickness
T5 fifth homogeneous electromagnetic thickness

We claim:

1. A method for optimizing a radome for a radar device of a vehicle for radar performance metrics, wherein:
the radome comprises:
a front member made of a radar-transparent resin having a first homogeneous electromagnetic thickness (T1),
a second member made of a radar-transparent resin having a second homogeneous electromagnetic thickness (T2), and
a first gap between the front member and the second member of a third homogeneous electromagnetic thickness (T3), said first gap being filled by a gas or a radar-transparent resin, and
the method comprises one of the following steps:
individually optimizing the front member, the second member, and the first gap for radar performance metrics and jointly optimizing a unit comprising the front member, the second member, and the first gap for performance metrics, or
jointly optimizing a unit comprising the front member, the second member, and the first gap for radar performance metrics.

2. The method according to claim 1, wherein the second member is a functional member.

3. The method according to claim 1, wherein the radome further comprises:
a housing having a radar penetration section made of a radar-transparent resin, the radar penetration section having a fourth homogeneous thickness (T4),
a second gap between the radar penetration section and the second member, said second gap being filled by a gas or a radar-transparent resin,
wherein at least one of:
the radar penetration section and the second gap are individually optimized for radar performance metrics and a unit comprising the front member, the second member, the radar penetration section, the first gap, and the second gap is jointly optimized for radar performance metrics, or
a unit comprising the front member, the second member, the radar penetration section, the first gap, and the second gap is jointly optimized for radar performance metrics.

4. A radome for a radar device of a vehicle, the radome comprising:
a front member made of a radar-transparent resin having a first homogeneous electromagnetic thickness (T1),
a second member made of a radar-transparent resin having a second homogeneous electromagnetic thickness (T2), and
a first gap between the front member and the second member of a third homogeneous electromagnetic thickness (T3), said first gap being filled by a gas or a radar-transparent resin,
wherein at least one of:
a unit comprising the front member, the second member, and the first gap is jointly optimized for radar performance metrics, or
the front member, the second member, and the first gap are each individually optimized for radar performance metrics, and the unit is jointly optimized for radar performance metrics.

5. The radome according to claim 4, further comprising:
a housing having a radar penetration section made of a radar-transparent resin, the radar penetration section having a fourth homogeneous thickness (T4), and a second gap between the radar penetration section and the second member, said second gap being filled by a gas or a radar-transparent resin, wherein at least one of:

a unit comprising the front member, the second member, the radar penetration section, the first gap, and the second gap is jointly optimized for radar performance metrics, or the radar penetration section and the second gap are individually optimized for radar performance metrics and a unit comprising the front member, the second member, the radar penetration section, the first gap, and the second gap is jointly optimized for radar performance metrics.

6. The radome according to claim 4, wherein the second member is a functional member.

7. The radome according to claim 6, wherein the functional member and/or the front member comprises a plurality of opaque sections.

8. The radome according to claim 6, wherein the functional member comprises one or more light outcoupling units and/or one or more light optimization elements.

9. The radome according to claim 4, wherein the second member comprises illumination elements.

10. The radome according to claim 4, wherein the front member has a first surface facing to an exterior and a second surface facing to the second member, and wherein at least one further layer is applied to the first surface.

11. A radar device for a vehicle, the radar device comprising:

a radar transceiver for emitting and receiving radar waves; and a radome according to claim 4, wherein the radar transceiver is arranged such that the radar waves emitted by the radar transceiver are penetrating the radome.

12. A cladding component for a vehicle, the cladding component comprising either:

a radome according to claim 4, or a radar device comprising:

a radar transceiver for emitting and receiving radar waves; and a radome according to claim 4, wherein the radar transceiver is arranged such that the radar waves emitted by the radar transceiver are penetrating the radome.

13. A vehicle comprising the radar device according to claim 11.

14. A vehicle comprising the cladding component according to claim 12.

* * * * *